United States Patent [19]

Reid et al.

[11] Patent Number: 5,006,320

[45] Date of Patent: Apr. 9, 1991

[54] MICROBIOLOGICAL OXIDATION PROCESS FOR RECOVERING MINERAL VALUES

[75] Inventors: William W. Reid, 11 Sunrise Dr., Englewood, Colo. 80110; Joseph L. Young, 1450 Joshua Dr., Reno, Nev. 89509

[73] Assignees: William W. Reid; Joseph L. Young; U.S. Gold Corporation

[21] Appl. No.: 488,866

[22] Filed: Mar. 5, 1990

[51] Int. Cl.[5] ............................................... C22B 3/02
[52] U.S. Cl. .................................... 423/150; 423/109; 423/262; 435/822
[58] Field of Search ........................ 423/150, 109, 262; 435/822

[56] References Cited

U.S. PATENT DOCUMENTS

| | | | |
|---|---|---|---|
| 2,829,964 | 10/1955 | Zimmerley et al. | 75/104 |
| 3,218,252 | 8/1963 | Glover et al. | 210/4 |
| 3,305,353 | 3/1964 | Duncan et al. | 75/101 |
| 3,856,913 | 12/1974 | McElroy et al. | 423/27 |
| 4,250,030 | 2/1981 | Kuit et al. | 210/684 |
| 4,728,082 | 3/1986 | Emmett | 423/150 |
| 4,729,788 | 3/1988 | Hutchins et al. | 75/118 |
| 4,732,608 | 3/1988 | Emmett, Jr. et al. | 75/101 |
| 4,822,413 | 4/1989 | Pooley et al. | 75/118 |

OTHER PUBLICATIONS

"Use of Micro-Organisms for the Recovery of Metals", by O. H. Tuovinen and D. P. Kelley, *International Metallurgical Reviews*, vol. 19, pp. 21–31 (1974).

"Biological Pre-Oxidation to Enhance Gold and Silver Recovery from Refractory Pyritic Ores and Concentrates", by R. W. Lawrence et al., CIM Bulletin vol. 76, No. 857, pp. 107–110 (1983).

"Commercial-Scale Bioleaching of Gold", in *Bioprocessing Technology*, vol. 10, No. 8, pp. 1–2, (1988).

*Primary Examiner*—Peter D. Rosenberg
*Attorney, Agent, or Firm*—Sheridan, Ross & McIntosh

[57] ABSTRACT

A process for the biological oxidation of sulfide in sulfide-containing ore. Preferably, the ore is then subjected to cyanide leaching. The resulting leach tail solution can be subjected to cyanide precipitation, employing ferric sulfate which is generated during the biological oxidation step of the process. Furthermore, a process for efficiently aerating the ore slurry during the biological oxidation step is provided.

52 Claims, 3 Drawing Sheets

MICROBIOLOGICAL OXIDATION PROCESS FOR RECOVERING MINERAL VALUES

FIELD OF THE INVENTION

The present invention relates generally to a microbiological process for aiding the extraction of metal values from ores and specifically to a process for efficiently aerating microorganisms employed in the oxidization of sulfide ores which are subsequently leached with cyanide and in which the cyanide is precipitated from the tail solution after the leaching process.

BACKGROUND OF THE INVENTION

The oxidation of sulfide ores by bacteria has been known for a number of years. The first realization that a certain type of bacteria is capable of oxidizing sulfide sulfur in combination with metals was advanced by Colmer and Hinkle in 1947. The name "thiobacillus ferrooxidans" was assigned to this bacteria around 1951.

In a general review article entitled "Use of Micro-Organisms for the Recovery of Metals" by O. H. Tuovinen and B. P. Kelly (1974), it is alleged that there are no insurmountable problems preventing scaling-up of laboratory scale fermenter systems to the multiple-thousand gallon level. Tuovinen et al. point out that: "Problems in scaling-up to be met are (a) adequate oxygen supply; (b) adequate carbon dioxide supply required for bacterial growth; (c) adequate agitation by mechanical stirring or air lift devices (stirring at high speeds insures rapid, efficient gas transfer in solution with minimum air-bubble size and the thorough mixing of the culture so that it and its effluent remain continuously homogenous); (d) the maintenance of low pH." However, in spite of the recognition of the need for adequate aeration and agitation, a commercial scale solution has not been previously disclosed.

A number of patents have recognized the importance of aeration. For example, U.S. Pat. No. 2,829,964 by Zimmerley et al. issued Apr. 8, 1958, discloses a process for regenerating ferric sulfate from ferrous sulfate solution. The ferric sulfate solution is employed as a lixiviant for the leaching of metal values from ores. Zimmerley et al. recognize the importance of aeration, however, only known methods for accomplishing it are discussed. Zimmerley et al. disclose that the regeneration is "ordinarily accomplished by mere aeration applied sufficiently vigorously to accomplish the desired regenerative result." It is also disclosed that aeration techniques of various kinds are well known and therefore do not constitute a part of the Zimmerley et al. invention. Consequently, Zimmerley et al. do not describe any new aeration process or apparatus. As examples of known methods for aerating the mixture, the following are disclosed as ways in which oxygen and carbon dioxide required by the bacteria during the conversion process can be supplied: (1) bubbling of compressed air through the solution; (2) vigorous agitation of the body of solution by mechanical means; (3) cascading of the solution; and (4) the provision of extensive surface area relative to the depth.

U.S. Pat. No. 3,305,353 by Duncan et al. issued Feb. 21, 1967, discloses a leaching process which comprises contacting sulfuritic ore with thiobacillus ferrooxidans while simultaneously agitating and/or aerating the mixture in order to oxidize ferrous iron, if present, and sulfide in the ore. It is disclosed that increased rates of bacterial activity are achieved due to an increased supply of oxygen and an improved opportunity for the bacterial cells to contact mineral surfaces. However, the aeration equipment employed by Duncan et al. was of the type which was commercially available at the time, for example as used in activated sludge sewage treatment plants. It is also disclosed by Duncan et al. that the metal is directly leached and placed in solution as a result of the microbiological process.

Two common techniques which are presently employed to aerate microbiological systems are: (1) high shear agitator systems; and (2) diffuser membrane systems. The high shear agitator systems typically employ an impeller and a means for introducing a gas near the impeller. The systems produce relatively small gas bubbles. However, the required energy input to rotate the impellers is relatively high. Additionally, the high shear generated by the impellers may have a negative effect on microorganisms. Membrane systems are also employed for forming small bubbles. However, the rate at which gas can be added to a system is limited by the transfer rate of the gas through the membrane. Also, because the membranes are typically located at the bottom of fermentation vessels, the gas must be supplied under high pressure if the vessel is deep.

Therefore, it would be advantageous if a method for aerating a commercial scale fermentation vessel in an efficient and economical manner could be provided. It would be advantageous if the method could be employed in the oxidation of an ore contained in a slurry. It would be advantageous if the method could improve the economical recovery of metal values from sulfide ores. It would be advantageous if the oxidation could be employed in conjunction with a cyanide leach process to economically and efficiently recover metal values on a commercial scale. It would be advantageous if the by-products from the oxidation process could be employed downstream to remove cyanide contained in tailings from a cyanide leaching process.

SUMMARY OF THE INVENTION

In accordance with the present invention, a process is provided for the biological oxidation of sulfide in sulfidecontaining ores. Preferably, the ore is then subjected to a leaching process, more preferably with a cyanide lixiviant. The resulting cyanide-containing leach tail solution can be treated with ferric sulfate generated during the initial biological oxidation step in order to precipitate cyanide therefrom.

In accordance with one embodiment of the present invention, a process is provided for recovering metal values from iron- and sulfide-containing ore. The process includes the step of inoculating a slurry of the ore with microorganisms, preferably thiobacillus ferrooxidans, capable of oxidizing at least the sulfide contained in the ore. By allowing the microorganisms to oxidize at least a portion of the sulfide in the ore, the ore is transformed into a form which is more susceptible to cyanide leaching. The desired metal values are then leached from the ore using cyanide as a lixiviant. Preferably, this is accomplished using a carbon-in-leach or carbon-in-pulp leaching process. The metal values are then recovered. Cyanide is precipitated from the leach tail solution by contacting the leach tail solution with ferric sulfate which is generated during the oxidation of the sulfide in the ore.

Preferably, the pH of the initial ore slurry is between about pH 1 and about pH 2 and the redox potential or Eh of the slurry is greater than +520 millivolts (mv). Preferably, the ore comprises pyrite, arsenopyrite or other sulfides and the metal values can include gold, silver, copper, and other metals. After the cyanide is precipitated from the leach tail solution, the solution can be subjected to flocculation and filtration steps in order to further remove cyanide, preferably to a level of less than 200 parts per billion cyanide and more preferably to a level of less than 50 parts per billion cyanide.

In accordance with another embodiment of the process of the present invention, a process is provided for biologically oxidizing sulfide contained in an ore. A slurry of the ore is initially inoculated with microorganisms, preferably thiobacillus ferrooxidans. In order to promote the activity of the microorganisms, the vessel in which the slurry and microorganisms are contained is subjected to aeration. The aeration process includes the step of pumping a volume of the slurry from the vessel through a mixing chamber, injecting a gas, preferably an oxygen- and/or carbon dioxide-containing gas such as air, into the mixing chamber and creating turbulence to mix the gas and the slurry.

Preferably the turbulence is created by repeatedly dividing fluid streams within the mixing chamber and dispersing the divided fluid streams, for example, using an in-line static mixer. Preferably, the biological oxidation takes place on a continuous basis and in stages. More preferably, the first stage comprises two separate tanks connected in parallel, the second stage comprises a single tank connected in series with the output of the first stage and the third stage comprises a single tank connected in series with the output of the second stage.

In accordance with another embodiment of the process of the present invention, a process for precipitating cyanide from a solution is provided. The cyanide is precipitated using ferric sulfate solution. The ferric sulfate solution is generated by oxidizing an iron-containing material with microorganisms. Preferably the iron-containing material is iron- and sulfide-containing ore which is oxidized with thiobacillus ferrooxidans. The ferric sulfate which is generated during the biological oxidation process is added to a solution containing cyanide in order to precipitate cyanide from said cyanide-containing solution. The solution which has been subjected to cyanide precipitation can be further subjected to flocculation and/or filtration steps in order to further remove cyanide and/or other impurities. Preferably, the resulting solution contains less than 200 parts per billion cyanide and more preferably less than 50 parts per billion cyanide.

DETAILED DESCRIPTION OF THE INVENTION

The process of the present invention will be described with reference to the FIGS. 1-5. In the FIGURES, like items are identified by like and corresponding numerals for ease of reference.

Figure 1:
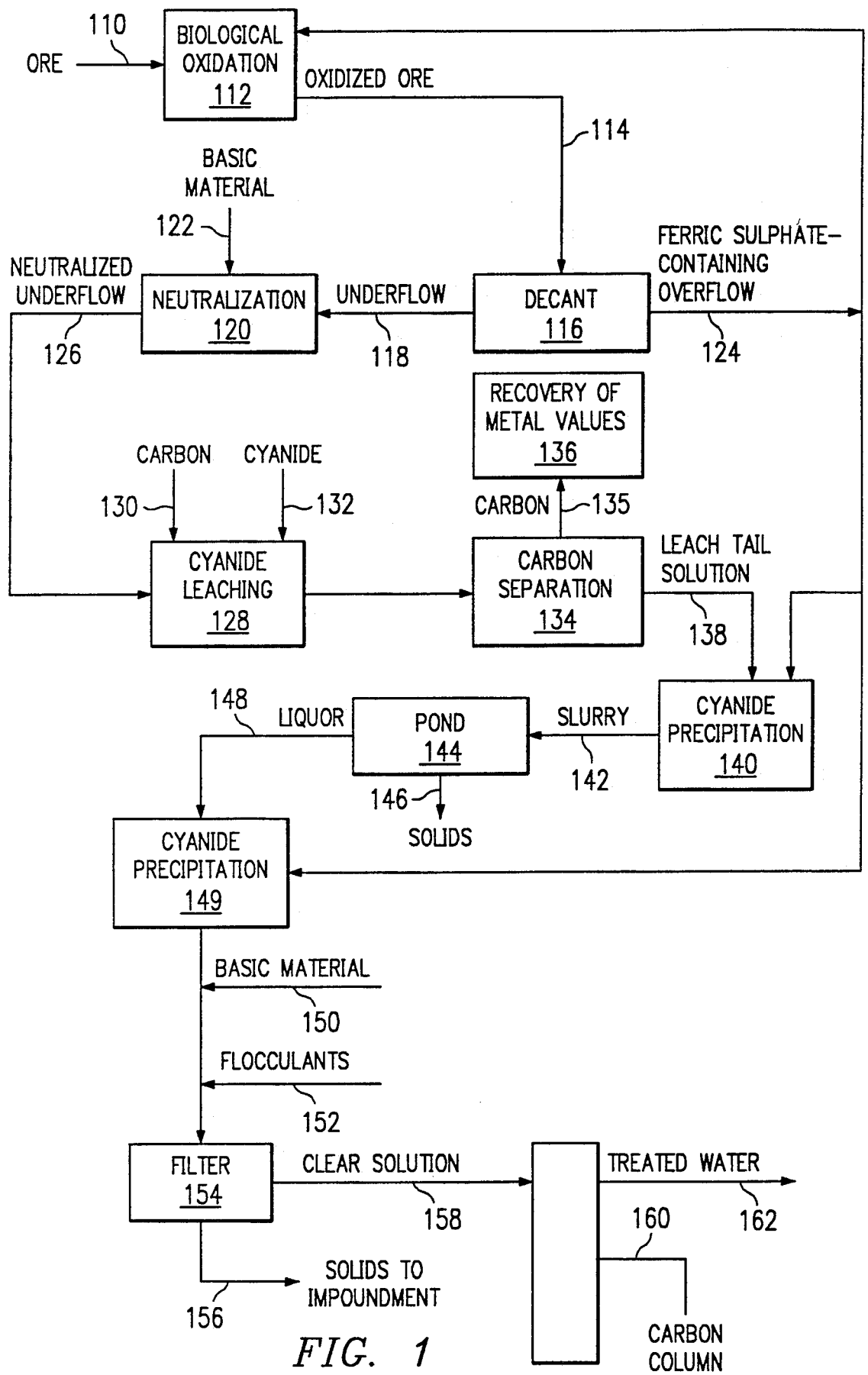
FIG. 1 is a flow diagram of a preferred embodiment of the overall process of the present invention.

In FIG. 1, a flow diagram illustrates a preferred embodiment of the overall process of the present invention. As shown in FIG. 1, an ore slurry 110 is prepared according to known techniques. The preparations (not shown) can include grinding and concentration (e.g. flotation) in order to obtain a suitably sized ore concentrate. Preferably, the ore is less than 100 mesh in size. The concentrate is then mixed with water to form an ore slurry 110 which is introduced into a biological oxidation reactor 112. As will be appreciated, the ore can also be slurried after introduction into the reactor 112. The biological oxidation process will be described in more detail hereinafter. The biological oxidization transforms the ore into a form which is more amenable to leaching, e.g. using cyanide as a lixiviant.

The oxidized ore 114 is decanted 116. The underflow 118 is neutralized 120 using a basic material 122 such as lime. The overflow 124 from the decant stage 116 is saved for future downstream use. The neutralized underflow 126 is subjected to cyanide leaching 128. The cyanide leaching can be accomplished in any manner known in the art, such as heap leaching or vat leaching, and is preferably accomplished using a carbon-in-leach or carbon-in-pulp process, as described in more detail hereinafter. If either of these processes are employed, carbon 130 and cyanide 132 are added at the leach stage 128. The carbon 130 is subsequently removed 134. The removed carbon 135 is now loaded with metal values such as gold and silver which are recovered 136 from the carbon 135 in a known manner.

The leach tail solution 138 is transferred to a precipitation vessel 140 where the tail solution 138 is mixed with the overflow 124 from the decant stage 116. The overflow 124 contains ferric sulfate which causes cyanide to precipitate out of the leach tail solution 138 as a metal complex, e.g. $Fe(CN)_6^{4-}$. The precipitate-containing slurry 142 is sent to a settlement pond 144 where the precipitated solids 146 settle out and liquor 148 is subsequently drawn off. Additional ferric sulfate is added to cause further precipitation of cyanide 149. The liquor 148 can be subjected to pH adjustment, by adding basic material 150, and flocculation, employing flocculants 152 and then filtered 154 in order to further remove impurities. The solids are sent to impoundment 156 and the clear solution 158 can be subjected to additional purification treatment. For example, the clear solution 158 can pass through a carbon column 160 in order to further remove impurities, resulting in treated water 162.

In the present biological oxidation process, an ore slurry/microorganism mixture is placed within a tank of a process system which serves as a reactor vessel or a reaction zone. The term "microorganism" is used herein to include bacteria, yeast, algae, mold, fungus and the like. A portion of the mixture is drawn from the reaction zone into an injection zone where gas is injected into the portion of the mixture, forming a combined stream. The combined stream is directed into a turbulent zone, e.g. a static mixer, where a plurality of combined streams are formed and then recombined into a mixed stream. The mixed stream is then returned to the reaction zone to allow the gas to service microorganisms throughout the mixture within the reaction zone. Since the microorganisms use the gas during the oxidation process, a constant recycling of the mixture through the injection zone and the turbulent zone is required. It is desirable that all the constituents be thoroughly mixed so that the microorganisms have ready access to the ore, gas and any required nutrients.

The apparatus which allows the mixing of the gas with the ore slurry/microorganism mixture comprises a pump for circulating the mixture, means for injecting a gas into the mixture and a downcomer with a device for mixing the gas with the mixture, e.g. an in-line static mixer. The apparatus permits the gas to be mixed into the mixture with lower energy consumption and without significantly damaging the microorganisms. The static mixer produces a turbulent flow by providing a tortuous path through which a portion of the mixture and the gas must pass. As is described in greater detail hereinafter, the process of the present invention requires less external energy and operates at a higher efficiency than other known devices.

Preferably, in a continuous process after a certain percentage of the oxidation process is complete, the partially oxidized ore is transferred to another reaction zone in the process system for further oxidation. Further transfers can be conducted until the ore has undergone sufficient oxidation, as is predetermined in advance. After an initial startup time, a continuous flow of the mixture is established through the system.

Figure 2:
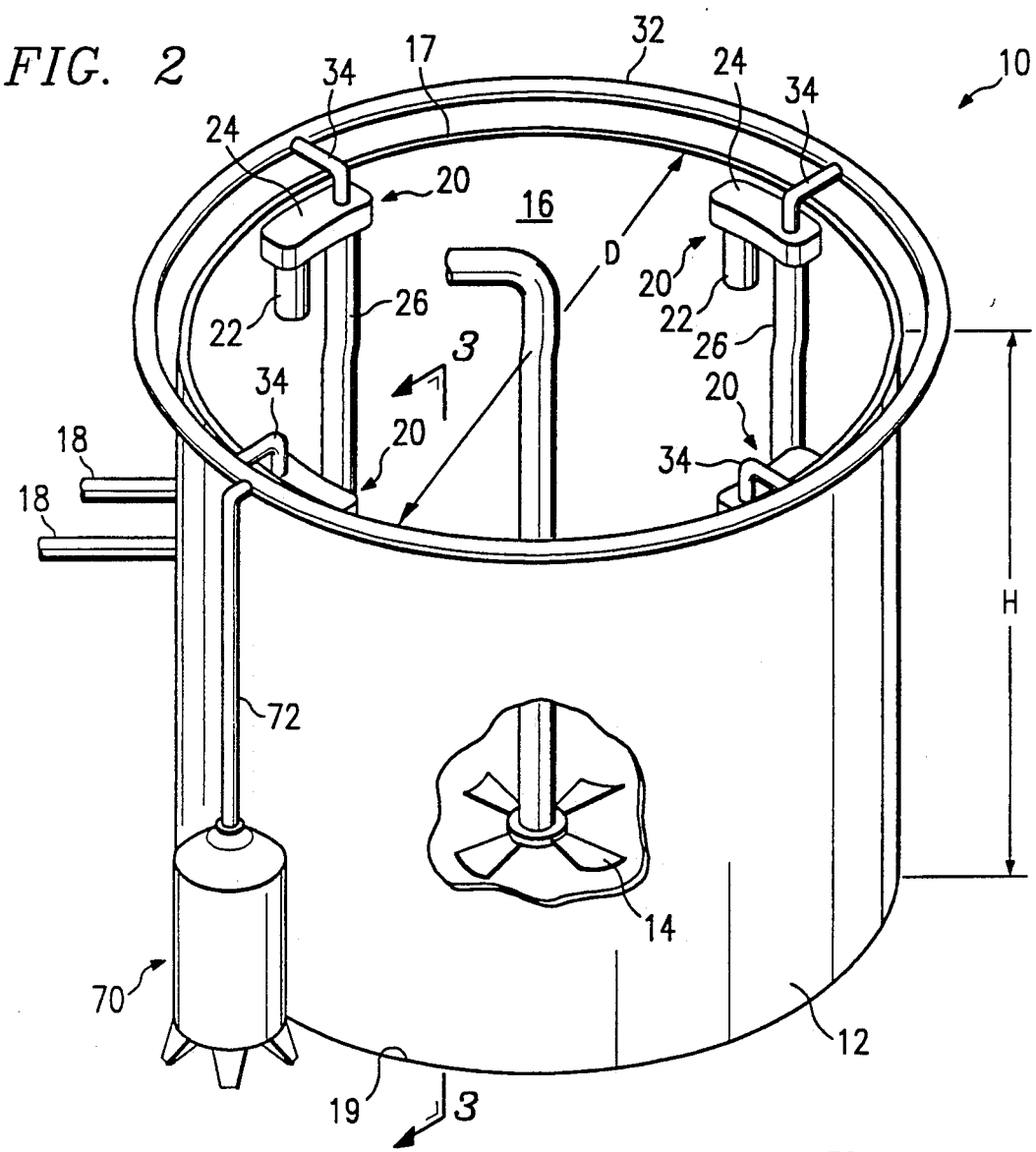
FIG. 2 is a perspective view of a biological reaction apparatus which can be employed in the process of the present invention.

Referring to FIG. 2, a perspective view of a biological oxidation apparatus is generally identified by the reference numeral 10. The apparatus 10 comprises a reaction zone or a tank 12 and an optional mixing device 14. The mixing device 14 can be, for example, a paddle or an impeller powered by a relatively low power motor. The mixing device 14 helps maintain even distribution of the various components of the mixture 16. Typically, the mixing device 14 is used to provide some agitation during startup of the apparatus 10 or if a pump 28, as subsequently described, is shut off.

The bulk of the mixture 16 can be introduced into the tank 12 by any appropriate means such as, for example, one or more inlet pipes 18. Although two pipes 18 are depicted, it is to be understood that as many separate inlets as are necessary can be used. The inlet pipes 18 may also be used to provide additional additives to the mixture 16 such as, for example, water or nutrients. A biological mass of the microorganisms can be formed in the tank 12 or can be pre-formed and added to tank 12 through the pipes 18 to form the mixture 16 containing microorganisms. Alternatively, all the individual components required to form the mixture 16 can be mixed externally and then introduced into the tank 12.

The tank 12 is typically cylindrical, having an open top end 17, a closed bottom end 19, a height H and a diameter D. The walls of the tank 12 preferably comprise a material that is resistant to the possibly corrosive reactions that take place within the tank 12. For example, the walls of the tank 12 can comprise stainless steel plates such as AISI type number 316L. Although not shown, the tank 12 can be covered to prevent external contamination, and although not normally required for aerobic processes, it can be sealed.

Positioned around the inner circumference of the tank 12 proximate the open top end 17 is at least one mixing assembly 20. The mixing assembly 20 comprises an intake pipe 22, a receiving box 24 and an injection zone or a downcomer 26. The box 24 serves to distribute the mixture 16 to the downcomer 26. Although not shown, it is to be understood that the function of the receiving box 24 could be accomplished by other means such as an elbow joint attached to the downcomer 26 or by connecting the downcomer 26 directly to a pump 28 (see FIG. 3). Positioned between the receiving box 24 and the intake pipe 22 is the pump 28. Located within the downcomer 26 is an in-line static mixer 30 (see FIG. 3). In the embodiment shown in FIGS. 2 and 4, the tank 12 has four mixing assemblies 20 evenly spaced inside the circumference thereof. Alternatively, although not shown, it is to be understood that the mixing assembly 20 can be replaced by an assembly or assemblies having a pump with multiple downcomers. For example, one pump can feed four downcomers or two pumps can each feed two downcomers, etc.

A manifold 32 preferably is fitted around the tank 12 for the distribution of a gas, such as air, oxygen or carbon dioxide. The gas is introduced into the manifold 32 from a source indicated generally at 70 and connected thereto by a line 72. The source 70 is preferably a blower capable of providing the required volume of the gas. Each mixing assembly 20 is provided with an inlet pipe 34 emanating from the manifold 32. As is described in greater detail below, the instant apparatus requires lower power than prior devices to provide the mixture 16 with sufficient gas for the oxidation process. Although not shown, it is to be understood that appropriate support structures are provided over the top end 17 of the tank 12 to hold, for example, the manifold 32 and the mixing device 14.

Figure 3:
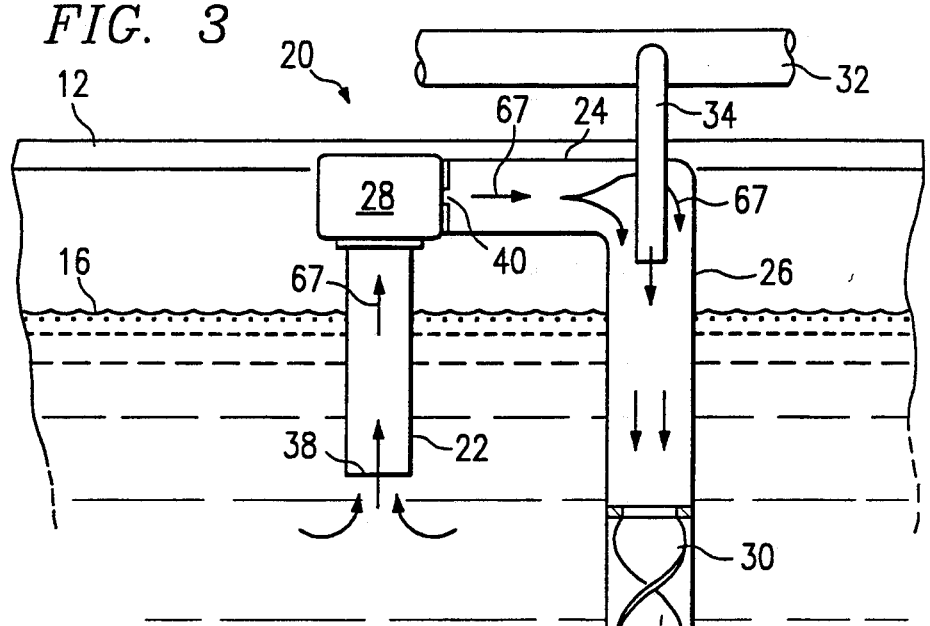
FIG. 3 is a cross-sectional view taken along the lines 3—3 of FIG. 2.

Referring to FIG. 3, a cross-sectional view of FIG. 2 along the line 3—3 is shown. The mixing assembly 20 comprises the generally horizontal receiving box 24. The receiving box 24 receives the mixture 16 which is drawn from the tank 12 by the pump 28. The pump 28 draws a portion of the mixture 16 from the tank 12 through the intake pipe 22 which is positioned with a first open end 38 below the surface of the mixture 16. The first open end 38 is preferably positioned just deep enough within the mixture 16 to ensure a constant feed to the pump 28. Alternatively, the pump 28 and the intake pipe 22 can be positioned external the tank 12 to draw the mixture 16 through a sidewall of the tank 12.

For efficient operation of the present process, the pump 28 should provide a flow rate that is preselected to provide the microorganisms within the mixture 16 with gas at approximately the rate at which the gas is consumed by the microorganisms. This gas consumption rate for a particular microorganism can be determined by a person skilled in the art. This calculation provides the "uptake rate," which permits selection of a pump having an appropriate flow rate. An easy way to determine the gas uptake rate is to place an appropriate amount of microorganisms in a sealed container and measure the time period in which the microorganisms substantially deplete the initial gas supply. The gas will need to be replenished in that time period.

A portion (as indicated by arrows 67) of the mixture 16 is pumped from an outlet 40 of the pump 28 into the receiving box 24. The receiving box 24 is generally horizontal and merges with the downcomer 26 at approximately a 90° angle. The portion 67 is thus pumped into the downcomer 26 where it is then returned to the tank 12 and mixed with the mixture 16. The inlet pipe 34 enters the downcomer 26 through the receiving box 24 and projects sufficiently into the downcomer 26 to allow the gas transported therethrough to merge with the mixture 16 to form a combined stream. In one embodiment, the downcomer 26 is fixed to a side of the tank 12. A deflecting device generally indicated by the reference numeral 80 can be provided to deflect discharge from the downcomer 26 away from the sides of the tank 12.

Positioned within the downcomer 26 below the inlet pipe 34 and below the surface of the mixture 16 is an in-line static mixer 30. As used herein, the term "in-line static mixer" refers to any number of fixed obstacles placed in the flow path to cause the mixture portion 67 to take a circuitous path through the downcomer 26. A suitable in-line static mixer 30 is, for example, a "LIGHTNIN INLINER" static mixer. The thorough mixing of the gas in the mixture 16 by the in-line static mixer 30 greatly increases the interface between the gas and the microorganisms, which increases the gas transfer efficiency. A key aspect of the present invention is the agitation of the mixture portion 67 near the point of introduction of the gas.

The use of the static mixer 30 allows intimate contact between the mixture 16 and the gas to promote absorption and also to obtain fine bubble dispersions with minimal mechanical energy input. The gas is first introduced into the flowing mixture portion 67 upstream of the mixer 30, and the gas is subsequently divided and dispersed by the mixer 30, thus forming a mixture portion 67 saturated with entrained, finely-divided bubbles. A three phase mixture with bubbles a few microns in size is formed as a result. This mixture serves as an effective source of gas to feed the microorganisms within the tank 12. The tiny bubbles also enhance the ability of the microorganisms to absorb the gas therein as the gas bubbles travel throughout the tank 12. Additionally, the mixer 30 produces less shear than in a high speed shear type mixer and is therefore less likely to cause trauma to the microorganisms passing therethrough.

Figure 4:
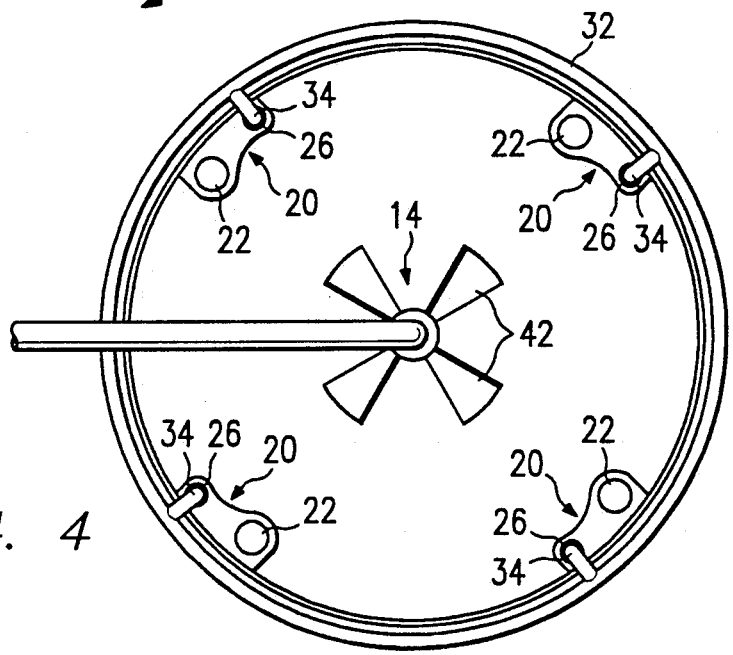
FIG. 4 is a top plan view of an apparatus which can be employed in the process of the present invention.

Referring to FIG. 4, a top plan view of the tank 12 is shown. The tank 12 is provided with four mixing assemblies 20 equally spaced around the circumference thereof. The manifold 32 is constructed around the circumference of the tank 12 in order to provide gas to each mixing assembly 20 through the inlet pipes 34. The mixture 16 is pumped from the tank 12 through the intake pipes 22 by the pumps 28 (FIG. 3) and thus into the receiving box 24. The mixture 16 is then returned to the tank 12 through the downcomers 26 after being mixed with the gas from the inlet pipes 34 and the mixing thereof by the in-line static mixers 30.

As previously indicated above, a mixing device 14 may also be provided. The mixing device 14 is driven by an appropriate drive arrangement through a motor (not shown). The device 14 is located in the approximate center of the tank 12 with the blades 42 located proximate the bottom of the tank 12. If the mixing assemblies 20 do not provide sufficient circulation of the mixture 16, the device 14 provides any additional mixing required to maintain a well dispersed slurry mixture 16 as well as initial circulation during startup. Therefore, the device 14 should be of a sufficient size relative to the tank 12 to provide agitation. Factors which effect the size and design of the device 14 include the characteristics of the mixture 16 such as viscosity and solids content, volume of the mixture 16, depth of the mixture 16, diameter of the tank 12 containing the mixture 16, and the like. The device 14 can have a plurality of impellers driven by separate shafts or by a single shaft The rotation speed of the mixing device 14 is chosen to correspond with the objective described above, i.e., to provide some agitation without causing trauma to the microorganisms, therefore, the speed of the device 14 is relatively slow and requires relatively low power when compared to high speed shear devices.

In operation, the tank 12 is typically a portion of a biological oxidation system. The system can be arranged with a plurality of tanks in various cooperating configurations to provide efficient oxidation. For example, such configurations may comprise side-by-side arrangements in parallel and/or series, stacked arrangements in parallel and/or series and combinations of side-by-side and stacked arrangements.

Figure 5:
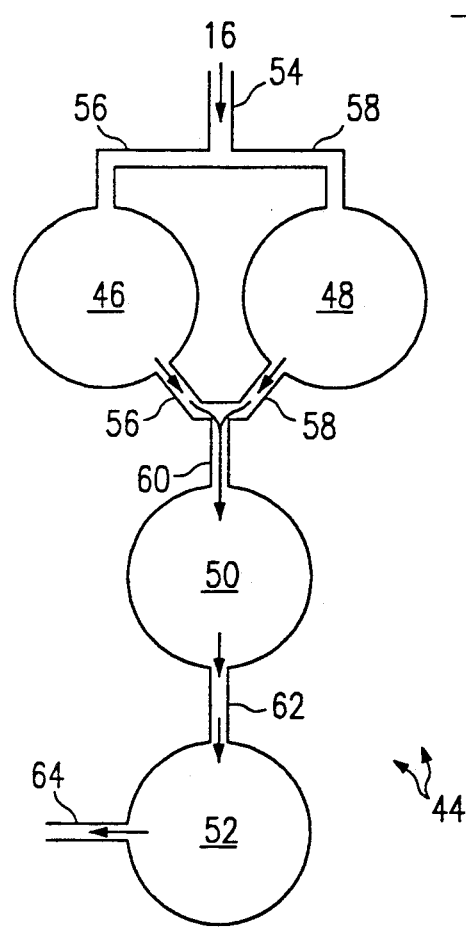
FIG. 5 is a top view of a three stage layout of the biological reaction apparatus useful in practicing an embodiment of the process of the present invention.

Referring to FIG. 5, a preferred embodiment of a system is schematically illustrated. In this preferred embodiment, the mixture 16 comprises a mixture of crushed gold-containing sulfide ore such as, for example, pyrite or arsenopyrite. The ore is ground, crushed and concentrated using devices that are well-known in the art and then mixed with water to form a slurry. The slurry is then mixed with microorganisms such as, for example, thiobacillus ferrooxidans and, if necessary or desired, appropriate nutrients such as sources of nitrogen, phosphorous and potassium to form the mixture 16. As will be appreciated, all or some of the components of the mixture 16 can be pre-mixed prior to introduction into tanks 46, 48 and all or some of the components can be mixed after introduction into the tanks 46, 48. Preferably the mixture comprises from about 30 to about 45 weight percent ore and a microorganism population of at least about 20,000,000 cells per cubic centimeter. As will be appreciated, the population will increase under appropriate conditions. It has been found that added nutrients are often not necessary, but if desired, appropriate nutrients can be added. A nutrient mixture can include, for example, from about 1 to about 3 grams/liter $(NH_4)_2SO_4$ and about 0.5 to about 2 grams/liter $KH_2PO_4$.

The mixture 16 is then fed into a tank system generally indicated by the reference numeral 44. The tank system 44 comprises four tanks 46, 48, 50 and 52 arranged in parallel and series. Although not shown, it is to be understood that other tank arrangements could be used. The four tanks 46, 48, 50 52 are constructed in accordance with the tank 12 previously described above.

The first tank 46 and the second tank 48 are in a parallel arrangement whereby one-half of the mixture 16 is fed to each tank equally from an inlet pipe 54 which splits into pipes 56 and 58. From the parallel tanks 46 and 48, the mixture 16 is merged through outlet pipes 56 and 58 into a single inlet pipe 60 to feed the third tank 50. From the third tank 50, a single pipe 62 transfers the mixture 16 to the fourth tank 52. From the fourth tank 52, an outlet pipe 64 feeds the mixture 16 to other processing devices (not shown).

Preferably, the tanks 46, 48, 50, 52 have a height H (see FIG. 2) in excess of forty feet and a diameter D (see FIG. 2) in excess of fifty feet and thus are capable of holding approximately 600,000 gallons of the mixture 16. It has been found that when the thiobacillus bacteria are present in an amount equal to about 250,000,000 cells per cubic centimeter they deplete the gas within the tanks 46, 48, 50, 52 in approximately four to five minutes. Therefore, each tank 46, 48, 50, 52 can be provided with four mixing assemblies 20 having high volume, low pressure pumps 28 therein. It is believed to be of some importance to the survivability of the bacteria to use pumps which are high volume but low pressure. The pumps 28 are, for example, axial flow pumps requiring 100 horsepower each and capable of pumping approximately 40,000 gallons per minute, preferably at pressures between about 8 and about 25 psi. Thus, a total of approximately 160,000 gallons per minute is pumped within each tank 46, 48, 50, 52 which corresponds to a total recycling of the entire 600,000 gallons within each tank 46, 48, 50, 52 every four to five minutes. Thus, gas is introduced in mixture 16 at a rate which approximates the gas uptake rate of the thiobacillus bacteria.

Gas is provided to the mixture 16 through a blower 70 connected to the manifold 32 (see FIG. 2). The blower 70 provides, for example, approximately 18,000 cubic feet per minute of air at 11.4 psi and requires approximately 500 horsepower. Therefore, the bacteria is provided with a new supply of gas every four to five minutes which matches the approximate uptake rate at which the bacteria uses the gas.

In order to optimize the oxidation reactions within the mixture 16 by the thiobacillus bacteria, it has been found that the mixture 16 is preferably retained within the first and second tanks 46, 48 for approximately 30 hours. This provides approximately 40% to 60% of the oxidation of the ore. The third tank 50 is then used to provide approximately an additional 25% to 35% of the oxidation of the ore and the fourth tank 52 provides the remaining approximate 15% to 25% of the oxidation. The mixture 16 is held within the third tank 50 and fourth tank 52 for approximately 15 hours each for a total of 60 hours residence time throughout the tank system 44 to appropriately oxidize the ore for the subsequent recovery of metal values, e.g. silver, gold and copper.

As a result of the invention herein described, lower power consumption is required to recover metal values from the ore. For example, if a high speed shear system (use of a paddle or impeller to rapidly mix the components) were used in each of the tanks 46, 48, 50, 52, a 2,500 horsepower motor would be required for each tank to provide the same degree of oxidation, while the present invention only requires approximately 400 horsepower for each tank. Additionally, the 500 hp required for the blower 70 is believed to be approximately one quarter of the power required using typical high shear systems. If the tanks 46 through 52 are provided with the mixing devices 14, the approximate power output for each is only an additional 25 to 75 hp. Thus, in the example shown in FIG. 5, a total of less than 2,500 hp ((400 hp×4 tanks)+500 hp+(75 hp×4)) is required to run the system 44 as compared to a minimum of 10,000 hp (2,500 hp×4 tanks) for a high shear system.

In operation, a continuous flow of the mixture 16 is established through the system 44. Due to the present invention, the bacteria used to recover gold is completely replenished with oxygen and carbon dioxide every 4 to 5 minutes which is approximately equal to the uptake rate thereof. The system 44 requires a total of sixty hours of residence time to complete the oxidation of the ore.

In starting up the biological oxidation stage of the process of the present invention, certain conditions are preferred. For example, it is preferred to employ ore having a high sulfide content for the initial biological oxidation reactor charge. A sulfide content of at least 2 weight percent based upon the total weight of the ore concentrate is preferred, and at least 5 weight percent sulfide is more preferred. The initial slurry introduced into the biological oxidation reactor should be at about 20 weight percent solids. The slurry redox potential or Eh ($Eh = E_o + K \log(Fe^{3+}/Fe^{2+})$) is adjusted to about +520 millivolts or greater prior to adding the inoculum by adding appropriate amounts of ferric sulfate ($Fe_2(SO_4)_3$). The pH of the slurry is adjusted to between about pH 1 and about pH 2 by adding appropriate amounts of sulfuric acid. Preferably, the addition of acid to lower the pH is delayed until just before the inoculum is added. The slurry is inoculated with as much biological mass as possible, preferably greater than about 10.5 pounds biomass per ton of ore.

There are a number of ways by which to accomplish the desired objectives. For example, the initial ore charge can be blended with a high pyrite ore in order to achieve the high sulfide content. A net sulfide content of about 3 percent permits adequate growth of the initial biological mass. When sulfide concentrations of less than about 1 percent are used, the initial biological mass tends to "peak" out very quickly. If feeding is started before or after the "peak" activity, the system may not flourish.

It is possible to adjust the slurry Eh by adding ferric sulfate, $Fe_2(SO_4)_3$. Generally, initial Eh adjustment requires about 15 to about 20 grams of $Fe_2(SO_4)_3$ per gallon of slurry. It has been found that by adjusting the Eh to +520 mv or more prior to inoculation, it is possible to reduce the start up time for laboratory scale reactors from greater than 10 days to about 3 days. Although $Fe_2(SO_4)_3$ is rather expensive as a pure reagent, an advantage of the present process is that $Fe_2(SO_4)_3$ is produced as a byproduct of the biological oxidation of iron- and sulfur-containing ores.

It is desirable to delay the acid addition as long as possible for at least two reasons. First, the heat generated by the acid reaction helps the biological oxidation tanks to reach operating temperatures, which are preferably 90 to 100° F. This is especially advantageous in cold weather. Second, the acid will put a large amount of metal ions into solution in their lower oxidation states, e.g. $Fe^{+2}$ and $As^{+3}$, which is undesirable. Having an excess of $Fe+2$ in solution prior to inoculation causes low Eh values. Microscopic studies have indicated that Eh has a similar environmental effect on biological mass that pH does. At Eh values below 520 mv it is possible to have a biological mass but the activity of this biological mass is minimal, i.e., little movement and cell division. This is referred to as the "lag phase" of culture development. Eh values in excess of 520 mv support biological mass that is active and this is where the "log phase" of culture development begins. This phase is characterized by exponential biological mass growth and an exponentially increasing oxidation rate. In addition to problems with ferrous iron, $As^{+3}$ has been documented as being extremely toxic to thiobacillus ferrooxidans, with the maximum tolerable limit being about 150 mg/l. Fortunately, $As^{+3}$ is relatively easy to oxidize to the much less toxic form $As^{+5}$. Eh values in excess of +500 mv assure that virtually all of the arsenic in solution is in the form of $As^{+5}$.

In order to start large biological reactors with a limited volume (e.g. about 2,000 gallons) of inoculum, it is important that the inoculum have a high concentration of bacteria. A practical way to accomplish this is to operate a pilot plant with a high pyrite material, which should be the same as is used for the initial blend in the large reactors so that the adaptation time is minimized. The following microscopic bacteria counts shown in Table I illustrate the importance of having a high pyrite concentration for start up:

TABLE I

| Example No. | Initial S (%) | Eh (mv) | Cells/cc |
|---|---|---|---|
| 1 | 1.32 | 565 | $2.2(10)7$ |
| 2 | 1.32 | 636 | $4.8(10)7$ |
| 3 | 2.53 | 588 | $9.8(10)7$ |
| 4 | 2.53 | 631 | $1.6(10)8$ |
| 5 | 11.36 | 573 | $2.0(10)8$ |
| 6 | 11.36 | 648 | $8.7(10)8$ |

After precious metal values are rendered amenable to recovery by biological oxidation of the ore, the oxidized ore can be subjected to further processes such as cyanide leaching. A carbon-in-leach (CIL) or carbon-in-pulp (CIP) process is preferably employed to effectuate the leaching. A typical CIL process is described in U.S. Pat. No. 4,289,532 by Matson et al. issued Sept. 15, 1981, and incorporated herein by reference in its entirety. The ore slurry suitable for treatment by a CIL process is prepared by well-known processes. A biological oxidation process is employed to treat the ore and render it more amenable to leaching. The pH of the oxidized ore slurry is adjusted, preferably to above about 10, more preferably in the range of about 10.5 to 11 by adding a basic material, preferably lime. The resulting alkaline slurry is transferred to the carbon-in-leach process.

In the carbon-in-leach circuit, the slurry is simultaneously contacted with cyanide and granular activated carbon. The carbon moves countercurrent to the flow of the slurry. Thus, a stream enters a first mixing vessel where it contacts a cyanide stream, which preferably contains cyanide in the amount of between about 0.25 and 2.5 pounds of cyanide expressed as sodium cyanide per ton of dry ore as disclosed in the Matson et al. '532 patent. The cyanide can be added in solid form, but it may also be added as a solution, for example, as a sodium cyanide solution having between about 10 and about 25 weight percent sodium cyanide by weight. Other sources of cyanide such as potassium cyanide and calcium cyanide can be used, as is well known in the art. Additional lime can be added to maintain the pH above about 10 in order to decrease cyanide decomposition.

A stream of the slurry is removed from the first vessel and transferred to a second agitated vessel. Activated carbon is screened from the slurry being transferred to the second vessel and fresh activated carbon is introduced into the second vessel. A slurry containing cyanide, ore and activated carbon is transferred back to the first vessel. A slurry containing loaded carbon is removed from the first vessel for subsequent recovery of precious metals by methods, such as stripping and electro-winning, which are well known in the art. A slurry which has been screened to remove the activated carbon is removed from the second vessel and preferably conveyed to a separation device, such as a screen, which removes any contained carbon. The remaining ore tailings are transferred to a cyanide precipitation process. Cyanide-containing solution is mixed with ferric sulfate solution, which has been produced as a result of the biological oxidation of sulfide- and iron-containing ore. The cyanide precipitates in the form of metal complexes, e.g. $Fe(CN)_6^{4-}$. Tailings from the process can be subjected to additional cleaning processes, such as flocculation and filtration.

A carbon-in-pulp (CIP) process may also be employed for the leaching steps of the process of the present invention. A typical CIP process is described in U.S. Pat. No. 4,578,163 by Kunter et al. issued Mar. 25, 1986, and incorporated herein by reference in its entirety. Ore is prepared in a mill, subjected to biological oxidation and, optionally, transferred to a classification device, such as a cyclone, which classifies the ore into sand and slimes. This classification is used where necessary depending on the ore and whether the sand is to be used as backfill. The sand is conveyed to a vessel where the pH of the sand is adjusted to the desired pH range by the use of a basic material such as lime. The vessel can be agitated or can be a stationary bed. If a stationary bed of the sand is used, it can be leached using a sodium cyanide solution containing about 0.045 to about 0.055 weight percent sodium cyanide by percolating the solution by gravity through the sand. If the vessel is agitated, then a solution containing about 1 pound of cyanide per ton of ore is used.

The slime which is separated from the sand is transferred to a carbon-in-pulp process. Optionally, the ore slurry can be transferred directly from the mill to a pH adjustment vessel. The slime is introduced into the pH adjustment vessel to which a basic material such as lime is added to increase the pH typically to at least about 10 and preferably at least about 10.5. The resulting alkaline slurry is transferred to an agitated vessel to which cyanide is added to provide a final concentration of about 1 pound based on sodium cyanide per ton of slurry. The pulp slurry fed to the agitated vessel preferably has a solids content of about 40 weight percent. Pulp from the agitated cyanidation tank is transferred to at least one and normally, a plurality of carbon-in-pulp vessels. As depicted in U.S. Pat. No. 4,578,163 by Kunter et al., normally four or more carbon-in-pulp vessels are operated in series to effect a countercurrent extraction with the activated carbon. The activated carbon is fed to the final vessel of the series. A slurry containing activated carbon is transferred from the final vessel ultimately to the first vessel. Simultaneously, a slurry, from which the activated carbon has been separated, is transferred from the first vessel to the final vessel. Loaded activated carbon is removed from the first vessel and precious metal values are subsequently removed from the carbon. A slurry stream, from which the activated carbon is substantially removed, is transferred from the vessels to a separation means which removes any remaining activated carbon. The remaining tailings are transferred to the cyanide precipitation process. The tailings from the precipitation process can be further purified, e.g., by flocculation and filtration.

The overflow 124 from the decant stage 116 typically contains from about 2.4 to about 3.2 grams $Fe^{3+}$ per liter or from about 0.02 to about 0.03 moles ferric sulfate per liter. This overflow 124 can be employed for two purposes. For example, in some instances, it can be recycled to the biological oxidation stage 112 in order to adjust the Eh to a suitable level, preferably above about +520 millivolts. Preferably, the ferric sulfate-containing overflow 124 is employed for cyanide precipitation in drop box 140. At a minimum, from about 1.5 to about 2.0 moles ferric sulfate are employed per mole of cyanide ion ($CN^-$) in the leach tail solution 138.

However, because ferric sulfate is produced during the process, it is preferable to employ amounts of 3 to 4 times in excess of the stoichiometric requirements.

The resulting slurry 142 is then subjected to liquid/solid separation. For example, the slurry 142 can be sent to a settlement pond 144 and the solids 146 can settle out by gravity, typically over the course of about two days. The liquor 148 from the settlement pond 144 can then be subjected to additional purification processes. For example, additional ferric sulfate, preferably 10 to 15 times in excess of stoichiometric requirements, can be added to precipitate additional cyanide 149. Flocculants 152 may then be employed to assist in the further purification of the liquor 148. Well-known purification processes to further reduce the cyanide level can also be employed, such as those employing hydrogen peroxide, sulfur dioxide or organic sulfides. Filtration processes 154, 160, for example employing carbon columns or ion exchange columns, can be employed to further purify the solution.

Surprisingly, it has been found that the leach tail solution 138 subjected to cyanide precipitation 140, 149, flocculation 152, filtration 154 and carbon column filtration 160 is purified to such an extent that it can be recycled to the biological oxidation reactor 112. This is surprising because very minute amounts of cyanide have been found to be toxic to thiobacillus ferrooxidans.

EXAMPLE

Ore is ground to about 80% -325 mesh and is floated in order to obtain a high sulfide concentrate which can be subjected to biological oxidation and leaching. An ore slurry consisting of 25 to 30 weight percent solids is acidified with $H_2SO_4$ to obtain a slurry having a solution pH of about pH 1 to pH 2. Thiobacillus ferrooxidan bacteria are added to the slurry, along with nitrogen, phosphorous and potassium nutrients (supplied as NPK fertilizer). The pulp density is 30 weight percent solids and the temperature is from 90 to 100° F. The reactor tanks are 52 feet in diameter and 43 feet high. The Eh is from +520 to +600 millivolts. The total residence time in the biological oxidation process is 60 hours, spread over three stages. The first stage comprises two tanks in parallel, each having a 30 hour residence time and the second and third stages comprise two tanks in series, each having a residence time of 15 hours. From 50 to 90 percent sulfide oxidation takes place in the biological oxidation stages. There is from about 2 to about 2.5 milligrams per liter dissolved oxygen in solution, and the nominal oxygen uptake rate is 160 milligrams oxygen per liter per hour over the course of the three stages. The aeration rate is 11,920 standard cubic feet per minute of air.

After the biological oxidation process stages, the slurry is sent to decant stages. Non-ionic and slightly anionic flocculants are employed at a nominal rate of 0.15 pounds per ton of solids. The feed pulp density is 25 to 30 weight percent solids and the pH is from pH 1 to pH 2. The underflow density is 50 weight percent solids. The overflow contains ferric sulfate ($Fe_2(SO_4)_3$) which is produced during the biological oxidation process stages and is subsequently employed downstream to precipitate cyanide from a leach tail solution. Additionally, the ferric sulfate can be recycled to the biological oxidation reactor in order to adjust the Eh value therein.

The underflow slurry (50 weight percent solids) is neutralized using approximately 12.5 pounds of lime per ton of solids. This is accomplished in two stages, wherein the pH in the first stage is raised to pH 3.5 and the pH in the second stage is raised to pH 10. During continuous processing, the lime is added at 0.44 tons per hour $Ca(OH)_2$ at 15 weight percent solids milk of lime. The slurry, now consisting of 40 weight percent solids, is then delivered to a cyanide leaching and absorption stage comprising a carbon-in-leach circuit.

The carbon-in-leach circuit includes seven stages, with each individual tank having a volume of 14,200 cubic feet. The tank dimensions are 26 feet in diameter by 27.5 feet in height. The inner tank screens comprise airswept, flooded cylindrical wedge wire with a screen aperture of 20 mesh. The nominal cyanide consumption is 5 pounds per ton of solid. The carbon type employed in the carbon-in-leach circuit is coconut or extruded, and the ASTM mesh carbon size is 6×12. The tail solution is designed to have less than 0.02 parts per million gold. The design carbon loading is 97 ounces gold per ton carbon and 122 ounces silver per ton carbon, and the design stripped carbon loading is less than 2.2 ounces gold per ton carbon. The total carbon residence time per stage is 80 hours and the carbon flow rate is 167 pounds per hour with a carbon concentration of 0.94 pounds per cubic feet. The carbon is continuously transferred between tanks by an air lift method and withdrawn from the carbon-in-leach circuit using a recessed impeller pump. The loaded carbon withdrawal time is 6 hours per day.

The leach tails solution are neutralized employing 38 pounds of lime per ton of solution to obtain a pH of 7.5. Overflow containing ferric sulfate from previous decant stages are added to the leach tail solution in order to precipitate cyanide and other metals. The cyanide precipitates as $Fe(CN)^{4-}_6$ and some metals precipitate as $Fe(OH)_x$, $FeO_x$ and $CaSO_4$. Initial precipitation takes place in a closed vessel due to potential hydrogen cyanide formation. Preferably, ferric sulfate is added in amounts of about 3 to about 4 times stoichiometric requirements in this initial closed vessel precipitation step. After precipitation the slurry is sent to a pond for settling. After about two days of settling, the liquor is drawn off and additional ferric sulfate, preferably from about 10 to about 15 times stoichiometric requirements, is added to the settling pond overflow. Next, about 5 parts per million cationic flocculant and 4 parts per million nonionic flocculant are added along with NaOH to adjust the liquor to a pH of 7. The NaOH addition is less than 0.5 milligrams per liter solution. The liquor is sent to a filter, with the solids going to impoundment and a clear solution going to further treatment by a carbon column in order to remove remaining impurities.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A process for recovering metal values from iron- and sulfide-containing ore comprising:
   (a) inoculating a slurry of said ore with microorganisms capable of oxidizing the sulfide contained in the ore;
   (b) allowing said microorganisms to oxidize at least a portion of the sulfide, thereby transforming the ore into a form which is more susceptible to cyanide leaching;

(c) leaching metal values from the ore using cyanide as a lixiviant;

(d) recovering the metal values; and (e) precipitating cyanide from a leach tail solution by contacting said leach tail solution with ferric sulfate generated during the oxidation of the sulfide in the ore.

2. The process as claimed in claim 1 wherein said microorganisms comprise thiobacillus ferrooxidans.

3. The process as claimed in claim 1 wherein gas is introduced into the slurry during the oxidation step by:
   (i) passing a volume of the slurry through a mixing chamber;
   (ii) injecting a gas into the slurry in the mixing chamber, and
   (iii) creating turbulence in order to thoroughly mix said gas and said slurry.

4. The process as claimed in claim 3 wherein said turbulence is created by repeatedly dividing and dispersing the fluid streams in the mixing chamber.

5. The process as claimed in claim 4 wherein the fluid streams are repeatedly divided and dispersed by an in-line static mixer.

6. The process as claimed in claim 1 wherein said ore is leached using a carbon-in-leach or a carbon-in-pulp process.

7. The process as claimed in claim 1 wherein the tail solution is further subjected to flocculation and filtration steps in order to further remove cyanide.

8. The process as claimed in claim 1 wherein the cyanide level in the leach tail solution is reduced to less than about 200 parts per billion.

9. The process as claimed in claim 1 wherein the cyanide content in the leach tail solution is reduced to less than 50 parts per billion.

10. The process as claimed in claim 1 wherein said ore comprises pyrite or arsenopyrite.

11. The process as claimed in claim 1 wherein said metal value is selected from the group consisting of gold, silver, and copper.

12. The process as claimed in claim 3 wherein said gas comprises air.

13. The process as claimed in claim 3 wherein said gas comprises oxygen.

14. The process as claimed in claim 3 wherein said gas comprises carbon dioxide.

15. The process as claimed in claim 1 wherein the Eh of said slurry prior to inoculation is at least about $+520$ millivolts.

16. The process as claimed in claim 1 wherein the pH of said slurry just prior to inoculation is from about pH 1 to about pH 2.

17. The process as claimed in claim 1 wherein acid is added to said slurry just prior to inoculation in order to adjust the pH to a range of about pH 1 to about pH 2.

18. The process as claimed in claim 1 wherein the amount of sulfide in said sulfide-containing ore is at least 1 weight percent.

19. The process as claimed in claim 1 wherein ferric sulfate is generated during the oxidation step and said ferric sulfate is recycled into said slurry in order to adjust the Eh of said slurry to at least about $+520$ millivolts.

20. A process for biologically oxidizing an ore comprising:

(a) inoculating a slurry of said ore with microorganisms;

(b) aerating the microorganisms within a vessel, wherein the aeration process includes the steps of:
   (i) pumping a volume of the slurry from said vessel through a mixing chamber,
   (ii) injecting gas into the mixing chamber, and
   (iii) creating turbulence to mix said gas and said slurry.

21. The process as claimed in claim 20 wherein said turbulence is created by repeatedly dividing and dispersing the fluid streams in the mixing chamber.

22. The process as claimed in claim 21 wherein the fluid streams are repeatedly divided and dispersed by an in-line static mixer.

23. The process as claimed in claim 20 wherein the volume of slurry which is pumped through said mixing chamber per minute comprises from about 18% to about 25% of the total slurry volume contained in the vessel.

24. The process as claimed in claim 20 wherein gas is introduced into said slurry in an amount sufficient to replenish the oxygen used by said microorganisms.

25. The process as claimed in claim 20 wherein the pH of said slurry is initially adjusted to a level of from about pH 1 to about pH 2.

26. The process as claimed in claim 20 wherein the Eh of said slurry is initially at least about $+520$ millivolts.

27. The process as claimed in claim 20 wherein said oxidation is accomplished continuously.

28. The process as claimed in claim 20 wherein said oxidation is accomplished in a series of continuous stirred tank reactors.

29. The process as claimed in claim 20 wherein said volume of slurry is pumped at a relatively low pressure.

30. The process as claimed in claim 20 wherein said slurry is pumped at a pressure from about 8 psi to about 25 psi.

31. The process as claimed in claim 20 wherein said vessel has a volume from about 550,000 gallons to about 650,000 gallons and the volume of slurry pumped through said mixing chamber per minute is from about 140,000 gallons to about 180,000 gallons.

32. The process as claimed in claim 20 wherein the aerated slurry is reintroduced into said vessel near the bottom of said vessel.

33. The process as claimed in claim 20 wherein said ore is ground to 80% $-325$ mesh prior to inoculation.

34. The process as claimed in claim 20 wherein said ore is a sulfide-containing ore and at least about 75% of the sulfide is oxidized in said oxidation process.

35. The process as claimed in claim 20 wherein said biological oxidation process is accomplished in a series of stages of tanks with a first stage comprising two tanks connected in parallel, a second stage comprising a single tank connected in series to the outlet from said first two tanks and a third stage comprising a single tank connected in series to the outlet of said second stage.

36. The process as claimed in claim 35 wherein the residence time in said first stage is from about 25 to about 35 hours, the residence time of said second stage is from about 12.5 to about 17.5 hours and the residence time of said third stage is about 12.5 to about 17.5 hours.

37. The process as claimed in claim 20 wherein said ore is a sulfide-containing ore and said oxidation process is accomplished in a series of stages of tanks and wherein from about 40% to about 60% of the oxidation of said sulfide is accomplished in a first stage, wherein about 25% to 35% of the oxidation of said sulfide is accomplished in a second stage and wherein about 15% to 25% of the oxidation of said sulfide is accomplished in a third stage.

38. The process as claimed in claim 20 wherein said gas is an oxygen-containing gas, a carbon dioxide-containing gas or mixtures thereof.

39. A process for recovering metal values from an ore comprising:
   (a) mixing crushed ore with a liquid to form a slurry;
   (b) inoculating the slurry with microorganisms;
   (c) aerating the microorganisms within a vessel, wherein the aeration process includes the steps of:
      (i) pumping a volume of the slurry from said vessel through a mixing chamber,
      (ii) injecting gas into the mixing chamber, and
      (iii) creating turbulence to mix said gas and slurry,
   (d) subjecting said oxidized ore to a leach process; and
   (e) recovering the desired metal values.

40. The process as claimed in claim 39 wherein said leach process is accomplished using a cyanide lixiviant.

41. The process as claimed in claim 40 wherein said leach process is accomplished using a cyanide lixiviant and further wherein cyanide-containing solution generated during the leach process is mixed with ferric sulfate from the oxidation process in order to precipitate cyanide.

42. The process as claimed in claim 41 wherein solution from the cyanide precipitation process is subjected to flocculation.

43. The process as claimed in claim 42 wherein solution from the cyanide precipitation process is subjected to filtration.

44. The process as claimed in claim 43 wherein solution from the cyanide precipitation process is passed through a carbon column.

45. A process for precipitating cyanide from a solution comprising:
   (a) oxidizing an iron-containing material with microorganisms;
   (b) producing ferric sulfate in said oxidation process;
   (c) adding ferric sulfate produced in said oxidation process to a solution containing cyanide in order to precipitate cyanide from said cyanide-containing solution.

46. The process as claimed in claim 45 wherein said oxidation step is performed on an iron-containing ore.

47. The process as claimed in claim 45 wherein said microorganisms comprise thiobacillus ferrooxidans.

48. The process as claimed in claim 45 wherein the solution which has been subjected to cyanide precipitation is then subjected to flocculation.

49. The process as claimed in claim 45 wherein the solution which has been subjected to cyanide precipitation is then subjected to filtration.

50. The process as claimed in claim 45 wherein the solution which has been subjected to cyanide precipitation is then subjected to carbon filtration.

51. The process as claimed in claim 45 wherein the amount of cyanide remaining in the solution which has been subjected to cyanide precipitation is less than 200 parts per billion.

52. The process as claimed in claim 45 wherein the amount of cyanide remaining in the solution which has been subjected to cyanide precipitation is less than 50 parts per billion of cyanide.

* * * * *

UNITED STATES PATENT AND TRADEMARK OFFICE
CERTIFICATE OF CORRECTION

PATENT NO. : 5,006,320
DATED : April 9, 1991
INVENTOR(S) : William W. Reid and Joseph L. Young It is certified that error appears in the above-identified patent and that said Letters Patent is hereby corrected as shown below:

Column 1, lines 33 and 34, delete "homogenous" and insert therefor --homogeneous--.

Column 2, lines 43 and 44, delete "sulfidecontaining" and insert therefor --sulfide-containing--.

Column 8, line 1, after "shaft" insert a period.

Column 10, line 47, delete "Fe+2" and insert therefor --$Fe^{+2}$--.

Signed and Sealed this

First Day of September, 1992

Attest:

DOUGLAS B. COMER

Attesting Officer

Acting Commissioner of Patents and Trademarks